US012792025B2

(12) United States Patent
Shaw et al.

(10) Patent No.: US 12,792,025 B2
(45) Date of Patent: Nov. 10, 2026

(54) CONTROL SYSTEMS AND METHODS FOR SCHEDULING AND MANAGING MANUFACTURING TASKS

(71) Applicant: Ford Global Technologies, LLC, Dearborn, MI (US)

(72) Inventors: Paul Christopher Shaw, Amherstburg (CA); Geovanne Salvatore Taormina, Jr., Monroe, MI (US); Brian Robert McIntyre, Dexter, MI (US); Micheal Jospeh Walker, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 18/540,263

(22) Filed: Dec. 14, 2023

(65) Prior Publication Data

US 2025/0199519 A1 Jun. 19, 2025

(51) Int. Cl.
*G05B 19/418* (2006.01)

(52) U.S. Cl.
CPC .................. *G05B 19/41865* (2013.01); *G05B 2219/32086* (2013.01)

(58) Field of Classification Search
None
See application file for complete search history.

(56) References Cited

U.S. PATENT DOCUMENTS 8,311,905 B1 * 11/2012 Campbell .............. G06Q 10/08 235/382
12,536,516 B2 * 1/2026 Cella ...................... B33Y 50/02
2003/0120369 A1 * 6/2003 Takaoka ................. G06Q 10/06 709/200
2011/0144786 A1 * 6/2011 Pearce ............. G05B 19/41865 700/100
2014/0365943 A1 * 12/2014 Senesac .............. G06F 3/04842 715/771
2016/0375918 A1 * 12/2016 Wills ...................... B61L 27/12 246/3
2018/0072551 A1 * 3/2018 Burkhard ................ B67C 7/004
2018/0075506 A1 * 3/2018 Burkhard .................. B65B 7/00
2019/0236507 A1 * 8/2019 Bauer .............. G05B 19/41805
2019/0276241 A1 * 9/2019 Royce .............. G05B 19/41865
2020/0140028 A1 * 5/2020 Wells .................... G05D 1/0225
2020/0183371 A1 * 6/2020 Park ................. G05B 19/41895
2021/0232989 A1 * 7/2021 Rana ....................... B25J 9/1694
2022/0089237 A1 * 3/2022 Sverdlov ................ B25J 9/1697
2022/0187847 A1 * 6/2022 Cella ................ G05B 19/41885
2023/0045713 A1 * 2/2023 Wohlstadter .......... G06F 3/0482
2023/0161583 A1 * 5/2023 Fang ...................... B60R 16/023 701/36
2024/0220924 A1 * 7/2024 Hazan .................. G06Q 10/087
2024/0241620 A1 * 7/2024 Wohlstadter .......... G06F 3/0482

FOREIGN PATENT DOCUMENTS

GB 2513709 11/2014
JP 6757816 9/2020

* cited by examiner

*Primary Examiner* — Hua Lu
(74) *Attorney, Agent, or Firm* — Burris Law, PLLC

(57) ABSTRACT

A method for scheduling and managing tasks including the receipt of a request for a task list from one or more workstations, the determination of a task list based on one or more identifiers and product order specific information received from a scheduling system, updating the task list, and sending the updated task list to the one or more workstations.

20 Claims, 8 Drawing Sheets

CONTROL SYSTEMS AND METHODS FOR SCHEDULING AND MANAGING MANUFACTURING TASKS

FIELD

The present disclosure relates to scheduling and managing tasks. More specifically, the present disclosure relates to using a dynamic relationship between manufacturing components to manage and schedule tasks based at least on upstream and downstream communication between the manufacturing components.

BACKGROUND

The statements in this section merely provide background information related to the present disclosure and may not constitute prior art.

Manufacturing of assemblies (e.g., vehicles) typically utilizes processes that do not support the importation and/or communication between varying engineering systems. For example, when a task is rejected or determined to be incomplete, the vehicle assembly will typically stop so that the assembly can be partially torn down before the assembly restarts in consideration of reintroduced build instructions. Alternatively, when a task is rejected or determined to be incomplete, the vehicle assembly will continue and then later in the assembly process (e.g., at the end of the vehicle assembly) have a larger tear down performed. The present disclosure addresses these and other issues related to the manufacture of assemblies.

SUMMARY

This section provides a general summary of the disclosure and is not a comprehensive disclosure of its full scope or all of its features.

The present disclosure provides a method comprising: receiving, from one or more workstations, a request for a task list, wherein the request includes one or more identifiers; determining, based on the one or more identifiers and product order specific information received from a scheduling system, a task list; updating the task list, wherein updating the task list is based on build history, one or more prerequisite statuses, or a combination thereof; and sending, to the one or more workstations, the updated task list; further comprising: storing, from a process editing tool, one or more configurations associated with the one or more workstations; wherein one or more configurations include configuration hardware data, a list of component types, a list of tasks with configuration details associated with one or more workstations, or a combination thereof; wherein the request for the task list is generated by: a software controller of the one or more workstations; or a data translation service associated with the software controller; wherein the software controller is configured to monitor a progression of an assembly through each of the one or more workstations; wherein one or more task results are sent, to the database, by: the software controller; or a data reporting service associated with the software controller; and wherein the one or more identifiers include a vehicle identification number, a component identification, a unit identification, a part identification, a carrier identification, or a combination thereof.

The present disclosure provides a system comprising: a task builder configured to: receive, from one or more workstations, a request for a task list, wherein the request includes one or more identifiers, determine, based on the one or more identifiers and product order specific information received from a scheduling system, a task list, update the task list, wherein the update to the task list is based on build history, one or more upstream prerequisite statuses, or a combination thereof, and send, to the one or more workstations, the updated task list; the one or more workstations configured to: send, to the task builder, the request for the task list, and send, to the database, one or more task results; the scheduling system configured to: receive, from the taskbuilder, a request for the product order specific information, and send, to the taskbuilder, the product order specific information; and the database configured to: receive, from the one or more workstations, data associated with the build history and prerequisite statuses, receive, from the taskbuilder, a request for the build history and the prerequisite statuses, and send, to the taskbuilder, the build history and the prerequisite statuses; wherein the system is further configured to: store, from a process editing tool, one or more configurations associated with the one or more workstations; wherein the one or more configurations include configuration hardware data, a list of component types, a list of tasks with configuration details associated with the one or more workstations, or a combination thereof; wherein the request for the task list is generated by: a software controller of the one or more workstations; or a data translation service associated with a software controller of the one or more workstations; wherein the software controller is configured to monitor a progression of an assembly through each of the one or more workstations; wherein the one or more task results are sent by: the software controller; or a data reporting service associated with the software controller; and wherein the one or more identifiers include a vehicle identification number, a component identification, a unit identification, a part identification, a carrier identification, or a combination thereof.

The present disclosure provides one or more non-transitory computer-readable media storing processor-executable instructions that, when executed by at least one processor, cause the at least one processor to: receive, from one or more workstations, a request for a task list, wherein the request includes one or more identifiers; determine, based on the one or more identifiers and product order specific information received from a scheduling system, a task list; update the task list, wherein the update to the task list is based on build history, one or more upstream prerequisite statuses, or a combination thereof; and send, to the one or more workstations, the updated task list; wherein the at least one processor is further caused to: store, from a process editing tool, one or more configurations associated with the one or more workstations; wherein the one or more configurations include configuration hardware data, a list of component types, a list of tasks with configuration details associated with the one or more workstations, or a combination thereof; wherein the request for the task list is generated by: a software controller of the one or more workstations; or a data translation service associated with the software controller; wherein the software controller is configured to monitor a progression of an assembly through each of the one or more workstations; and wherein the one or more identifiers include a vehicle identification number, a component identification, a unit identification, a part identification, a carrier identification, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
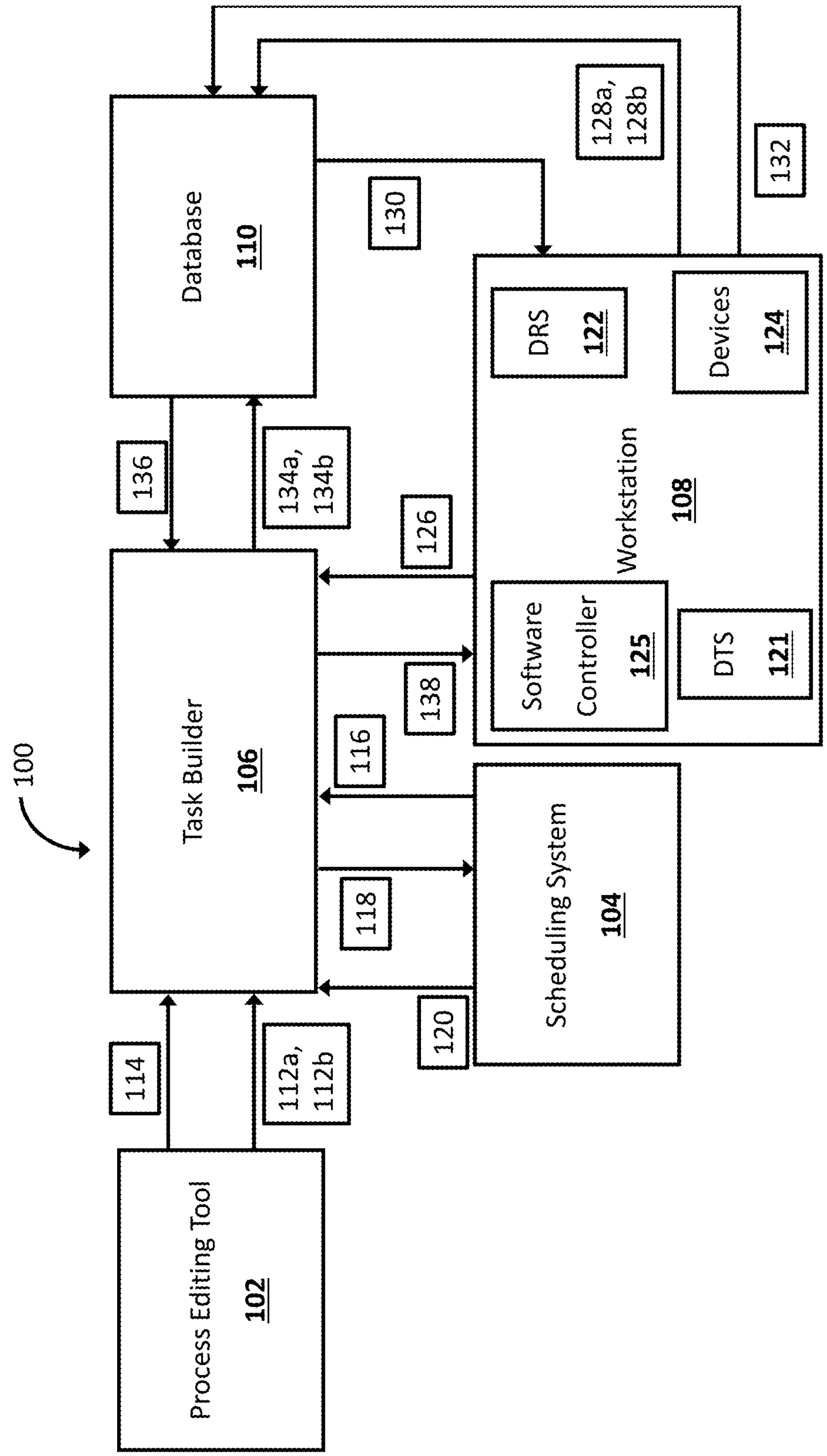
FIG. 1 illustrates an example of a manufacturing control system (MCS) in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

One or more herein described examples provide a means for scheduling and managing tasks in real-time within a manufacturing setting. A dynamic relationship between manufacturing components is utilized in some implementations to manage and schedule tasks based at least on upstream and downstream communication between the manufacturing components. As a non-limiting example, and as will be further discussed, such upstream and downstream communication may be exchanged by any workstation and taskbuilder. However, it is understood that any workstation may exchange upstream and downstream communication with any manufacturing component. At least one advantage provided by such a relationship is to minimize faults within the manufacturing process so that assemblies do not have to be taken apart to remedy improper builds. Without use of the described dynamic relationship, manufacturing times can be significantly longer and result in numerous inefficiencies that the described dynamic relationship mitigates. As such, use of the described dynamic relationship provides financial benefits associated with these inefficiencies and the time spent resolving the improper builds.

Additionally, implementation of one or more examples provides a zero faults forward method scheme that employs the use of prerequisite tasks so an assembly can continue to be partially built. As such, any steps that would need to be disassembled to perform the repair can be skipped.

Additional issues that this disclosure provides at least one solution for is for current error proofing that does not have sufficient provisions for backup stations and/or repair stations; automatic and manual stations that have different control/quality methods; a lack of means for differentiating when to build, or not build, on a suspect assembly; and uncontrolled repairs.

Additional benefits that this disclosure provides is that the outcome of the manufacturing process generates: standard hardware alignment reducing spare part complexity and enables savings through economies of scale; standard software strategy across vehicle operations manufacturing engineering and/or powertrain manufacturing engineering final assembly business units, which results in cross-functional resource support capability; and provides financial benefits as a result of insourcing software and eliminating ongoing production support by suppliers.

FIG. 1 shows a schematic block diagram of a manufacturing control system (MCS) 100. The MCS 100, in one or more examples, is configured to facilitate an assembly of one or more vehicles (not shown). However, it is understood that the MCS 100 may be configured to facilitate the assembly of any product and within any manufacturing setting. Particularly, FIG. 1 is illustrative of a general structure of the MCS 100. In one or more examples, the MCS 100 is generally comprised of a process editing tool 102, a scheduling system 104, a task builder 106, a workstation 108, and a quality database 110 that are described in more detail herein.

Figure 2:
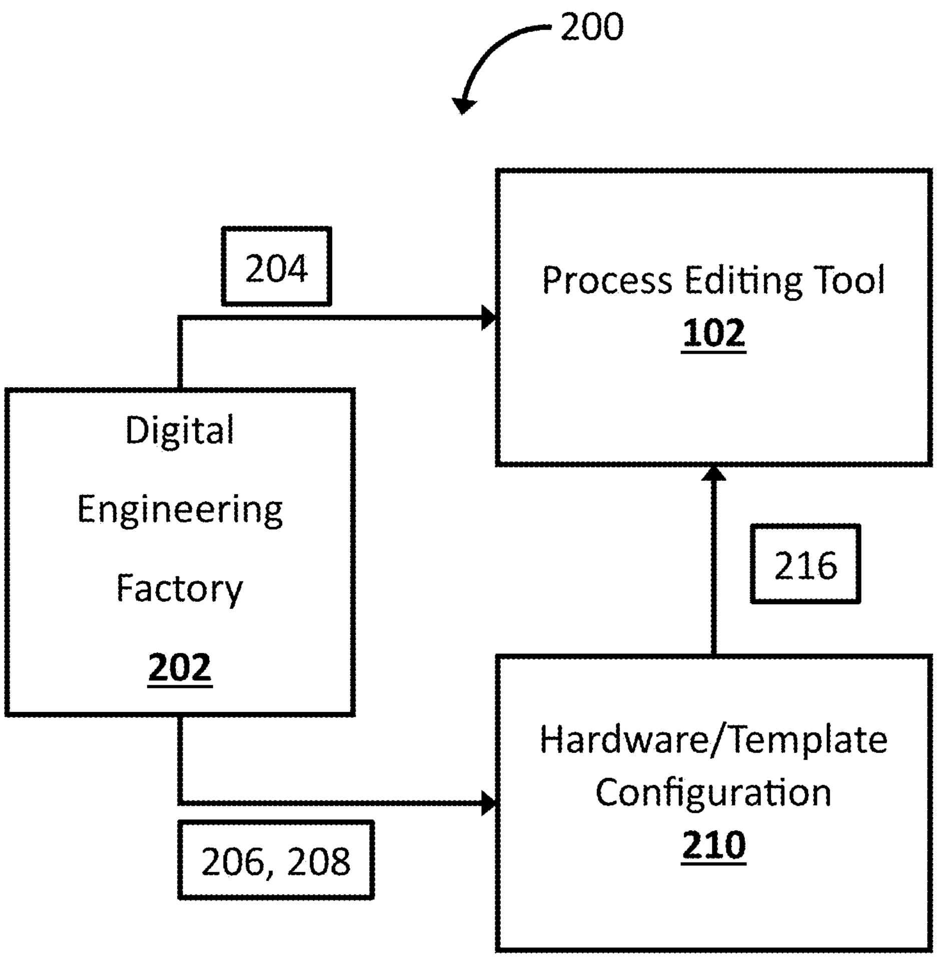
FIG. 2 illustrates an example system implementing a process editing tool of the MCS in accordance with various implementations.

With particular reference to FIG. 2, a system 200 associated with the process editing tool 102 and/or for implementing the process editing tool 102 is illustrated. The system 200 is generally implemented utilizing a digital engineering factory 202 and a hardware/template configuration 210. As is further described herein, each of the components associated with the system 200 (e.g., the digital engineering factory 202 and the hardware/template configuration 210) are configured to communicate with the process editing tool 102 at a configuration stage of the MCS 100. However, it is understood that each of the components associated with the system 200 may be configured to communicate with the process editing tool 102 at any time.

The digital engineering factory 202 is configured to assign and manage one or more tasks associated with the manufacturing of a vehicle. The digital engineering factory 202 is also configured to store a list of workstations and where each of the workstations exist within a manufacturing facility. Additionally, the digital engineering factory 202 is configured to send data 204 to the process editing tool 102 such as one or more details pertaining to the one or more tasks; a workstation listing; option content and process definition; part design numbers and/or part numbers; or a combination thereof.

The hardware/template configuration 210 is configured to import data from the digital engineering factory 202. For example, the digital engineering factory 202 is configured to export hardware inputs/outputs 206 to the hardware/template configuration 210. It is understood that the hardware inputs/outputs 206 imported from the digital engineering factory 202 are associated with a configuration of each of the workstations 108 of the plurality of workstations 108. As another example, the digital engineering factory 202 is further configured to export an auto sequence 208 with times and dependencies to the hardware/template configuration 210. It is understood that the auto sequence 208 with time and dependencies, imported from the digital engineering factory 202, are associated with a priority setting corresponding to which of the workstations 108 of the plurality of workstations 108 handle which task of the one or more tasks and at what time. The hardware/template configuration 210 is further configured to process each of the communications imported from the digital engineering factory 202. Additionally, the hardware/template configuration 210 is configured to export a station device list 216 and details associated with the determined auto sequence to the process editing tool 102.

The process editing tool 102 is configured to process all of the received data and information from each of the aforementioned components (e.g., the digital engineering factory 202 and the hardware/template configuration 210) within the system 200 associated with the process editing tool 102 to ultimately communicate information to the task builder 106, which is further described herein.

Figure 3A:
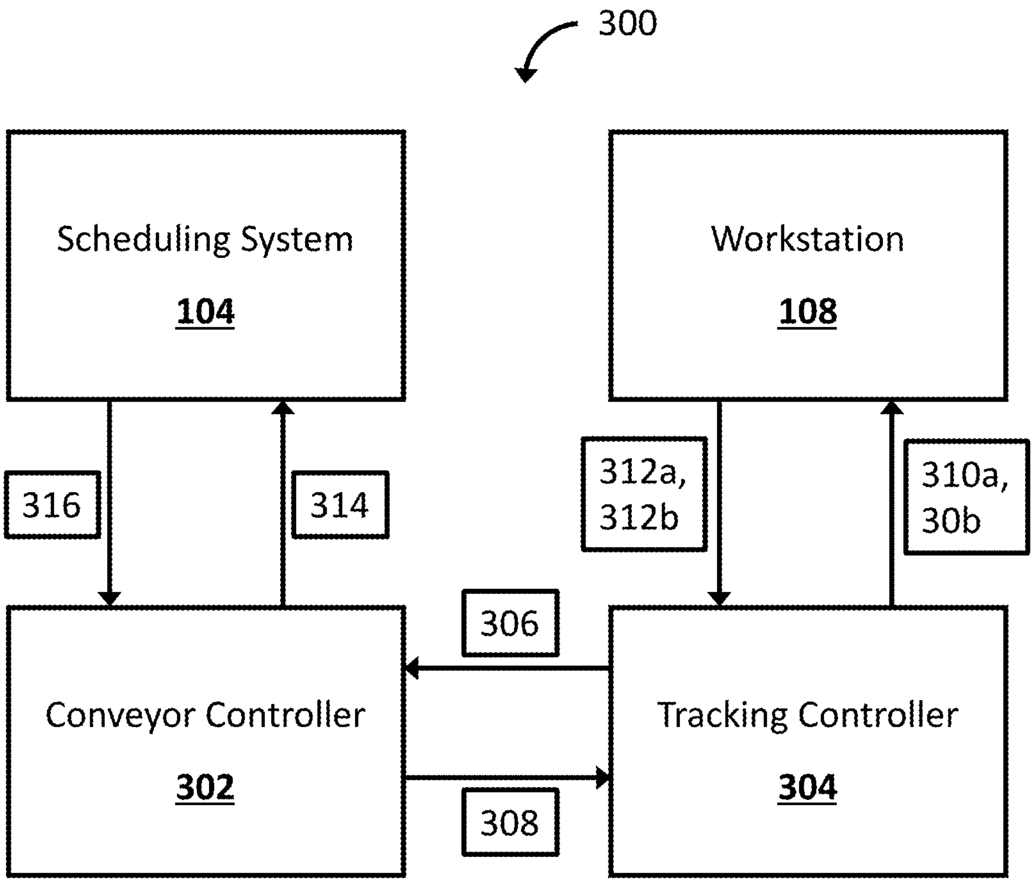
FIGS. 3A and 3B illustrate an example system implementing scheduling of the MCS in accordance with various implementations.
Figure 3B:
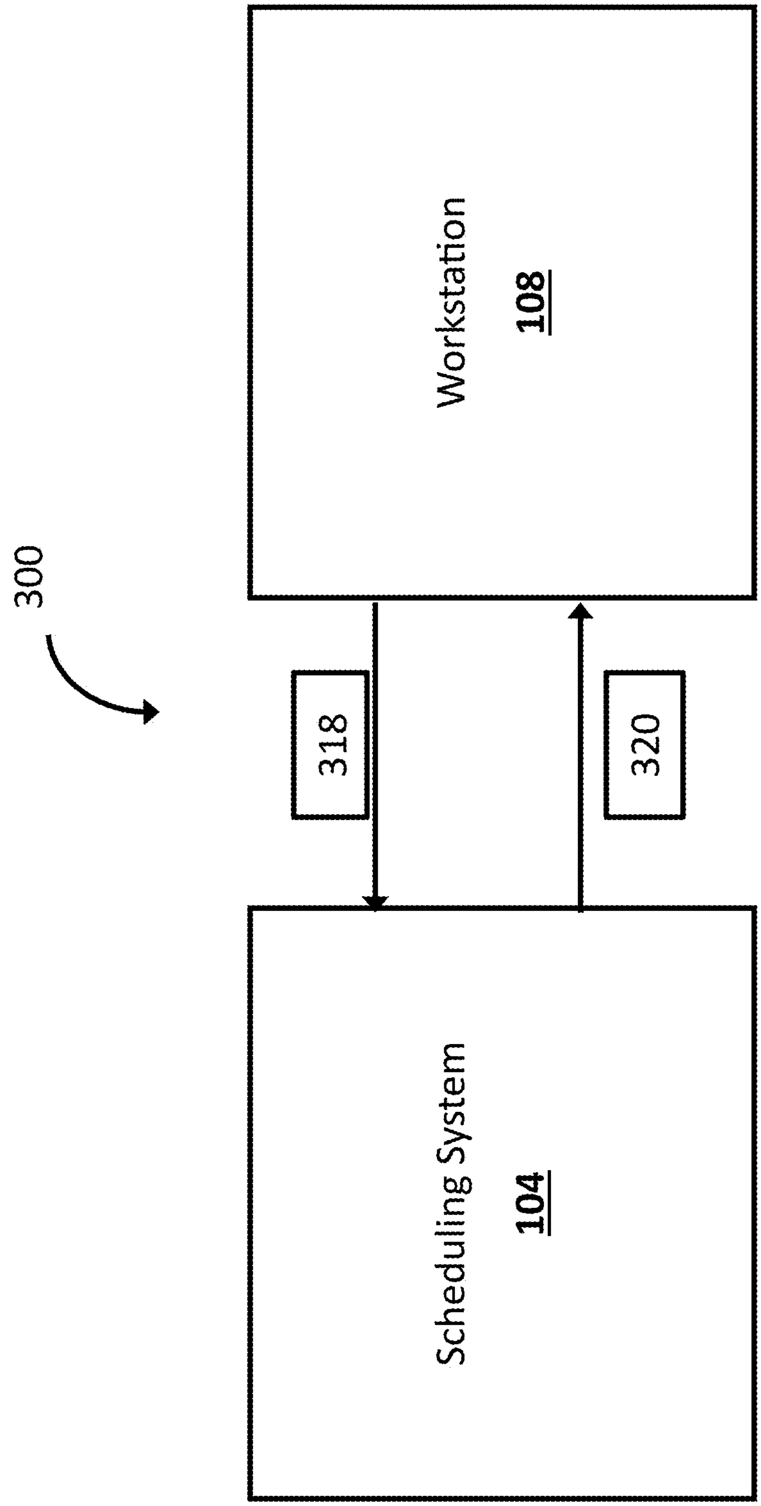

FIGS. 3A and 3B illustrate a system 300 associated with the scheduling system 104 and/or implementing scheduling operations. The system 300 is generally configured to facilitate communication between the scheduling system 104, a conveyor controller 302, a tracking controller 304, and the workstation 108.

With particular reference to FIG. 3A, the system 300 is in an online state, wherein the tracking controller 304 is configured to provide instructions 306 to the conveyor controller 302. For example, the tracking controller 304 can send an instruction 306 to stop operation of a conveyer associated with an assembly of the vehicle to the conveyor controller 304. As another example, the tracking controller 304 can send an instruction 306 providing permission to the conveyor controller 302 for the conveyer to continue, or to start operation associated with the assembly of the vehicle. The tracking controller 304 is also configured to receive data 308 related to the positioning of a carrier associated with the vehicle as well as the vehicle identification number (VIN) of the vehicle. Each communication that is sent and/or received from/by the tracking controller 304 is done using a transmission control protocol/internet protocol (TCP/IP) in some examples. However, it is understood that each communication that is sent and/or received from/by the tracking controller 304 may be sent via any means of messaging.

The tracking controller 304 can additionally send a part identification 310*a* and/or a location 310*b* to the workstation 108. As an example, with particular reference to FIG. 3A, the workstation 108 is an online station (e.g., a station that is included as a part of the main assembly line). It is understood that the part identification 310*a* corresponds to a particular part(s) that is being assembled. For example, the particular part(s) is associated with the vehicle and/or the vehicle itself. It is also understood that the location 310*b* is a particular location of the part along the assembly line associated with the vehicle and corresponding to a particular workstation (e.g., the workstation 108) of the plurality of workstations. In the instance wherein there are a plurality of workstations, the tracking controller 304 can send the part identification 310*a* and/or the location 310*b* via a multicast message broadcasted to each workstation 108 of the plurality of workstations. It is understood however, that the tracking controller 304 can send the part identification 310*a* and/or the location 310*b* via a unicast message, or any other type of message, as well. In response to the workstation 108 receiving the part identification 310*a* and/or the location 310*b* from the tracking controller 304, the workstation 108 can send an update 312*a* to convey that the task(s) is complete. The workstation 108 can also send an instruction (s) 312*b* to the tracking controller 304 to stop transport of the vehicle, part, and/or assembly, for example. It is understood that the workstation(s) 108 can send any of the updates 312*a* and/or the instructions 312*b* to the tracking controller 304 via a unicast message. However, it is also understood that the workstation(s) 108 can send any of the updates and/or the instructions to the tracking controller 304 via any type of message.

The tracking controller 304 is configured to send and/or receive each of the described communications during the assembly of the vehicle. It is therefore understood that the tracking controller 304 may communicate with the conveyor controller 302 and/or the workstation 108 throughout the entirety of the assembly of the vehicle. However, it is understood that the tracking controller 304 may be configured to communicate with the conveyor controller 302 and/or the workstation 108 at any time (e.g., before the assembly of the vehicle begins and/or after the assembly of the vehicle ends).

As the vehicle, or the assembly, first enters the assembly line associated with the manufacturing facility, the conveyor controller 302 is configured to send a build data request 314 to the scheduling system 104. It is understood that the build data request 314 is sent based on the instruction providing permission to the conveyor controller 302 to continue, or to start, assembly of the vehicle. It is further understood, however, that the build data request 314 may be sent in the absence of the instruction providing permission to the conveyor controller 302 to continue, or to start, assembly of the vehicle as well. The scheduling system 104 is configured to process the build data request 314 received from the conveyor controller 302 and send a build data response 316 back to the conveyor controller 302. The build data response 316 and the build data request 314 each pertain to a determination of what vehicle and/or vehicle component should be built in consideration of a build schedule. As another example, the build data response 316 and the build data request 314 ensure that the manufacture of the vehicle and/or vehicle component is aligned to the build schedule. It is understood that each of the build data request 314 and the build data response 316 are sent via message queuing telemetry transport (MQTT). However, it is also understood that each of the build data request and the build data response may be sent/received via any messaging means.

With particular reference to FIG. 3B, the workstation 108 is an offline station. For example, the offline station (e.g., the workstation 108) is a, single, stand-alone station that is off on the side and not part of the main assembly line. The scheduling system 104 is further configured to receive a build data request 318 from the workstation 108. In response to the build data request 318 received from the workstation 108, the scheduling system 104 can send a build data response 320 back to the workstation 108. It is understood that the build data response 320 and the build data request 318 are each associated with an instance wherein the build schedule requires the vehicle and/or vehicle component enter an off-line station (e.g., a standalone station) for building up one or more subassemblies. For example, the subassemblies are installed on the vehicle and/or vehicle component. As another example, the scheduling system 104 communicates instructions regarding what the subassembly will entail in association with each of the vehicle and/or vehicle components that are in-line to receive the subassemblies from the off-line station. It is further understood that at least the build data response 320 may also include any details associated with the vehicle. It is additionally understood that each of the build data request 318 and the build data response 320 exchanged between the scheduling system 104 and the workstation 108 are sent/received via MQTT. However, it is also understood that each of the build data request 318 and the build data response 320 may be sent/received via any messaging means. It is additionally understood that the communication between the scheduling system 104 and the workstation 108 may occur at any time (e.g., as the vehicle enters the line and/or during the assembly of the vehicle).

Figure 4:
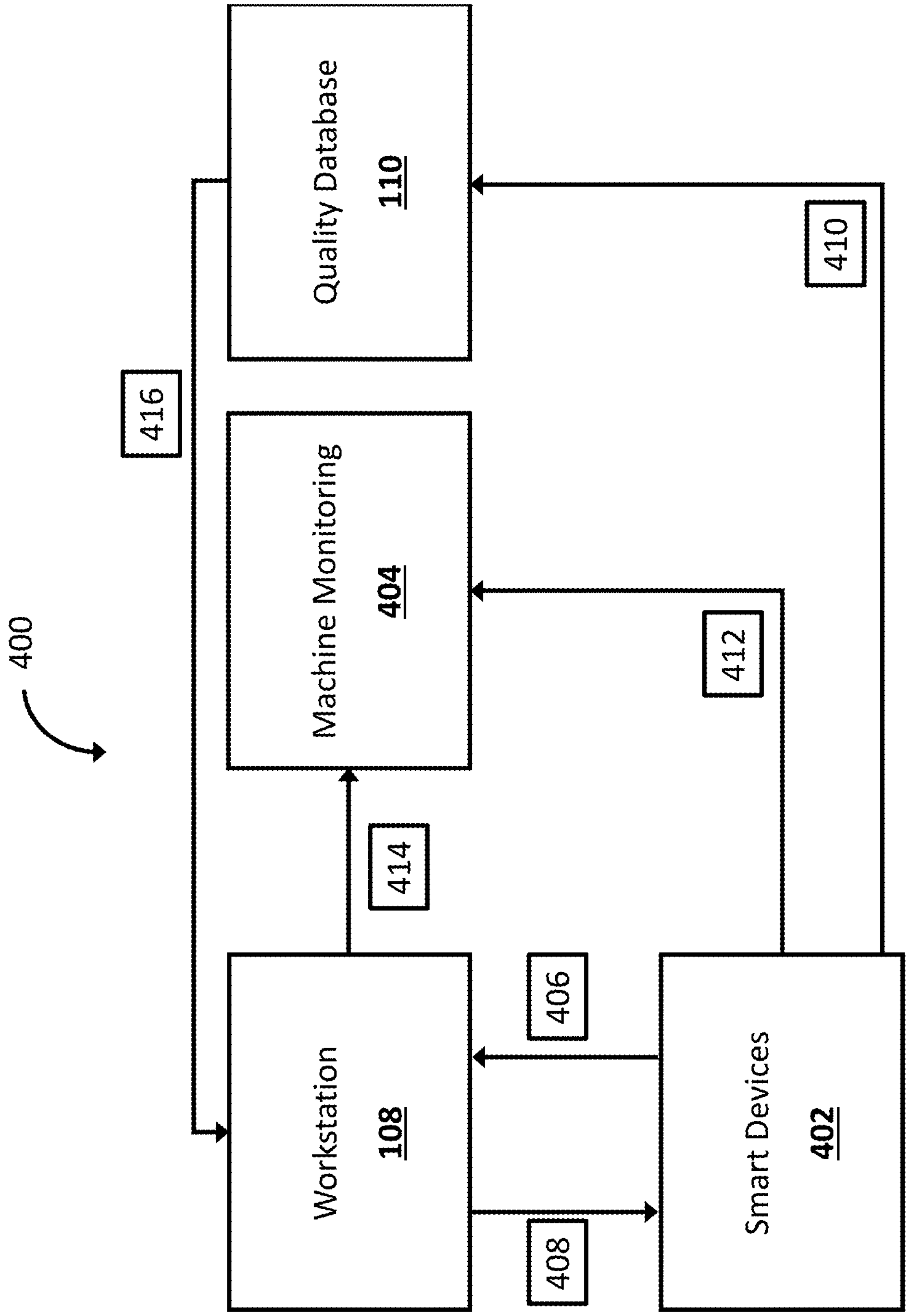
FIG. 4 illustrates an example system associated with a smart device in accordance with various implementations.

FIG. 4 illustrates a system 400 associated with one or more smart devices 402. More specifically, the one or more smart devices 402 can communicate with any of the workstation 108, the quality database 110, and/or a machine monitoring platform 404. However, it is understood that the one or more smart devices 402 may communicate with any component within the MCS 100. For example, the one or more smart devices 402 may communicate with the task builder 106, the scheduling system 104, and/or the process editing tool 102. As another example, it is understood that the one or more smart devices 104 may be a distributed test or electronic module test and/or a vision testing system.

The one or more smart devices 402 can send a status update 406 to the workstation 108. For example, the status update 406 can be whether implementation of a task has started or whether the implementation of the task has not started. In response to receiving the status update 406 from the one or more smart devices 402, the workstation 108 can send details 408 associated with the task and/or confirmation of whether the task has started to the one or more smart devices 402. The one or more smart devices 402 can also send data relating to one or more parts (e.g., partData 410) to the quality database 110. For example, the partData 410 includes task results, task features, or a combination thereof. It is understood, however, that the partData 410 may include any other task related information therein. Additionally, the smart device 402 can send information 412 related to a machine state, machine-related data, part data, information related to configuration of the machine, device metadata, or a combination thereof to the machine monitoring platform 404. It is understood that the smart device 402 may send any type of information to the machine monitoring platform 404. It is further understood that each of the messages sent to and/or from the smart device 402 are sent via MQTT.

The workstation 108 can also send information 414*a* related to a machine state, machine-related data, part data, information 414*b* related to configuration of the machine, device metadata, or a combination thereof to the machine monitoring platform 404. It is understood that the workstation 108 may send any type of information to the machine monitoring platform 404. It is further understood that the messages sent from the workstation 108 are sent via MQTT. However, it is also understood that each of the messages sent from the workstation 108 may be sent via any messaging means.

Referring again to FIG. 1, the process editing tool 102 is configured to send one or more station task lists 112*a* to the task builder 106. It is understood that the process editing tool 102 can also send configuration details 112*b* associated with the one or more station task lists to the task builder 106. Additionally, the process editing tool 102 is also configured to send one or more component lists 114 to the task builder 106. It is understood that the process editing tool 102 can also send the configuration details 112*b* associated with one or more workstations along with the one or more component lists 114 to the task builder 106 as well. It is further understood that the process editing tool 102 processes communications received by each of the components (e.g., the digital engineering factory 202 and the hardware/template configuration 210) within the system 200 associated with the process editing tool 102 before sending any communication to the task builder 106. Each of the described communications from the process editing tool 102 to the task builder 106 are sent via an application programming interface (API). However, it is understood that each of the described communications from the process editing tool 102 to the task builder 106 may be sent via any messaging means. Additionally, each of the described communications occur at the configuration of the MCS 100. However, it is understood that each of the described communications may be configured to communicate with the task builder 106 at any time.

The scheduling system 104 is configured to send one or more vehicle details 116 to the task builder 106. It is understood that the one or more vehicle details 116 can include a build data response. It is further understood that the one or more vehicle details 116 sent to the task builder 106 is sent via MQTT. However, it is also understood that the one or more vehicle details 116 sent to the task builder 106 may be sent via any messaging means. It is further understood that the scheduling system 104 processes communications received by the conveyor controller 302 within the system 300 associated with the scheduling system 104 before sending the one or more vehicle details 116 to the task builder 106.

The task builder 106 is configured to send a request 118 for one or more vehicle feature codes to the scheduling system 104. In response to the request 118 for the one or more vehicle feature codes received by the scheduling system 104, the scheduling system 104 is configured to send one or more details 120 associated with the one or more vehicle feature codes to the task builder 106. It is understood that both communications related to vehicle feature codes are sent via the API. However, it is understood that both communications related to vehicle feature codes may be sent via any messaging means. Each of the described communications being sent and/or received by/from the scheduling system 104 occur as the vehicle enters the assembly line associated with the manufacturing facility. However, it is understood that each of the described communications being sent and/or received by/from the scheduling system 104 may occur at any time.

The workstation 108 is generally comprised of a data translation service (DTS) 121, a data reporting service (DRS) 122, one or more devices 124, and a software controller 125. The software controller 125 interfaces with each of the components of the MCS 100 as well as a transport system associated with the assembly line. For example, the software controller 125 interfaces with the transport system to give permission for an assembly to leave the particular workstation. As another example, the software controller 125 interfaces with the transport system to sense (e.g., via one or more sensors) when a new assembly is entering the particular workstation. Additionally, the software controller 125 provides updates on a position of one or more parts at the particular workstation 108. The software controller 125 performs numerous other tasks, for example, the software controller 125 also manages tasks performed in the particular workstation 108, calls the correct tool with the correct parameters to perform the task, sets the status for the task, records the timing for the task, provides counts and result detail information, sets alerts for any issues that may arise, and provides state reporting.

In the instance wherein a new assembly enters the workstation, the software controller 125 interfaces with the data translation service 121 to trigger a task list request. The data translation service 120 converts and/or translates structured data associated with the software controller 125 into common data model (CDM) compliant JSON messages to publish over MQTT and subscribes JSON messages, which the data translation service 121 converts and writes to software controller 125 structures. For example, the JSON messages include task list messages for interfacing with the taskbuilder 106 and trigger messages for interfacing with MQTT capable external devices. It is understood, however, that the data translation service 121 may use any messaging means and may interface with any device. The software controller 125 can also interface with the data reporting service 122 in the instance wherein there is information to report to the machine monitoring platform 404. The data reporting service 122 converts and/or translates structured data associated with the software controller 125 into CDM compliant JSON messages to publish over MQTT to the machine monitoring platform 404 including IIoT Quality and database.

As an example, the one or more devices 124 can include a scanner, DCTools, a picklight, or a combination thereof. The workstation 108 is configured to send a part identification 126 to the task builder 106. For example, the workstation 108 processes communications received by the tracking controller 304 within the system 300 associated with the scheduling system 104. It is understood that the part identification 126 received by the task builder 106 is sent via MQTT. However, it is understood that the part identification 126 received by the task builder 106 may be sent via any messaging means. It is further understood that the workstation 108 sends the part identification 126 to the task builder 106 once at the start of an assembly cycle of the vehicle. For example, in the instance wherein a plurality of workstations 108 is used, each of the workstations 108 send the part identification 126 associated with that particular workstation 108 to the task builder 106 once at the start of the assembly cycle of the vehicle. However, it is understood that regardless of how many workstations 108 are used in the assembly process, the part identification 126 may be sent to the task builder 106 at any time.

The workstation 108 is further configured to send one or more part identifications **128*a* to the quality database 110. The workstation 108 is also configured to send one or more task labels 128*b* along with the one or more part identifications 128*a* to the quality database 110. In response, the quality database 110 can send data 130 associated with one or more task results to the workstation 108. Each of the communications between the workstation 108 and the quality database 110 are sent via MQTT. However, it is understood that each of the communications between the workstation 108 and the quality database 110 may be sent via any messaging means. Additionally, the workstation 108 is configured to send partData 132 to the quality database 110. For example, the partData 132 includes task results, task features, or a combination thereof. It is understood, however, that the partData 132 may include any other task related information therein. It is understood that the partData 132 received by the quality database 110 is sent via MQTT. However, it is understood that the partData 132 received by the quality database 110 may be sent via any messaging means. Additionally, each of the communications between the workstation 108 and the quality database 110 occur during the assembly of the vehicle. It is therefore understood that the workstation 108 may communicate with the quality database 110 throughout the entirety of the assembly of the vehicle. However, it is understood that the workstation 108 may be configured to communicate with the quality database 110** at any time (e.g., before the assembly of the vehicle begins and/or after the assembly of the vehicle ends).

The taskbuilder 106 is configured to communicate upstream to the quality database 110 and send one or more part identifications **134*a* to the quality database 110. The taskbuilder 106 is also configured to send one or more task labels 134*b* along with the one or more part identifications 134*a* to the quality database 110. In response, the quality database 110 sends data 136 associated with one or more task results to the taskbuilder 106. Each of the communications between the taskbuilder 106 and the quality database 110 are sent via the API. However, it is understood that each of the communications between the taskbuilder 106 and the quality database 110 may be sent via any messaging means. Additionally, each of the communications between the taskbuilder 106 and the quality database 110 occur once at the start of an assembly cycle of the vehicle. For example, in the instance wherein a plurality of the workstations 108 is used, each of the communications may repeat, respectively, for each particular workstation 108 at the start of the assembly cycle of the vehicle. However, it is understood that regardless of how many workstations 108** are used in the assembly process, each of the communications may occur at any time.

The taskbuilder 106 is further configured to process each of the communications exchanged between at least the process editing tool 102, the scheduling system 104, and the quality database 110 to respond to the part identifications **134*a* received from the workstation 108 by sending a part specific task list 138 to the workstation 108. The data translating service 121 is configured to translate the response including the part specific task list 138 received by the workstation 108. It is understood that the part specific task list 138 received by the workstation 108 is sent via MQTT. However, it is understood that the part specific task list 138 received by the workstation 108 may be sent via any messaging means. It is further understood that the task builder 106 sends the part specific task list 138 to the workstation 108 once at the start of the assembly cycle of the vehicle. For example, in the instance wherein a plurality of workstations 108 is used, the task builder 106 sends the part specific task list 138 to each of the workstations 108 once at the start of the assembly cycle of the vehicle. However, it is understood that regardless of how many workstations 108 are used in the assembly process, the part identification may be sent to each of the workstations 108** at any time.

The taskbuilder 106 is further configured to store configurations specific to the one or more workstations 108 that include station configuration hardware details, a list of component types, and a list of tasks with configuration detail that can be performed by a particular workstation 108. In one implementation, when the taskbuilder 106 receives a task list request from the workstation 108 with a specific part ID (e.g., VIN, CID, Unit/Part ID), the taskbuilder 106 looks up product order specific information from the scheduling system 104 to determine what tasks need to be performed along with any tool specifics (e.g., fastening programs, barcodes, etc.). The taskbuilder 106 also looks at upstream process results for the vehicle from a build history. The build history may be stored in the quality database 110, for example. The taskbuilder 106 looks at upstream prerequisite task statuses along with the order specific option content to determine which tasks can be performed, not enabling any tasks that would need to be undone to perform repairs to incomplete upstream tasks. There can be thousands of variations of the vehicle at this point in the assembly process due to the different combinations of option content. The taskbuilder 106 creates a real-time task list specific to the vehicle at a particular state of the assembly of the vehicle.

Figure 5:
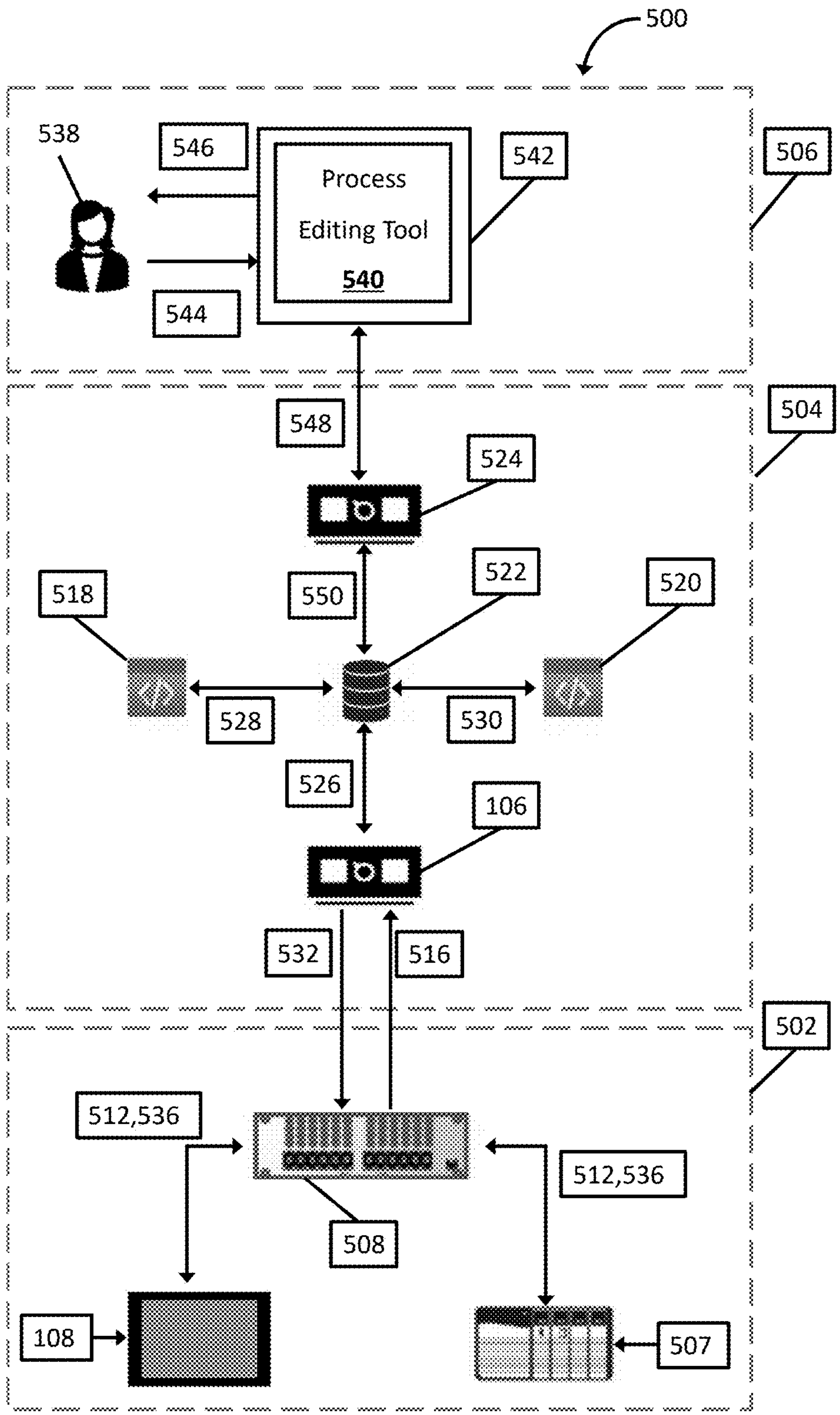
FIG. 5 illustrates another example an MCS in accordance with various implementations.

FIG. 5 illustrates a system 500 that generally depicts a relationship between a controls production network (CPN)

502, a plant server 504, and an enterprise data center (EDC) 506. The CPN 502 is configured to be downstream relative to the plant server 504 and the EDC 506. The CPN 502 is configured to facilitate operation associated with processes that occur at configuration of the MCS 100. For example, the CPN 502 is configured to facilitate operation associated with the workstation 108, for example. The CPN 502 is generally comprised of the workstation 108, an automatic station 507, and a restricted access switch 508. As an example, the automatic station 507 may be a programmable logic controller or any other automation-related controller. The network associated with the CPN 502 is divided into the CPN 502 for any plant floor devices and/or a manufacturer part number (MPN) for an upper level (e.g., the plant server 504, the EDC 506, or a combination thereof).

The workstation 108 and/or the automatic station 507 communicates with the restricted access switch 508 via a communication link 512. For example, the workstation 108 and/or the automatic station 507 sends (e.g., transmit) a request for a task list along with a particular VIN upstream. It is understood that the request for the task list may be sent to the restricted access switch 508 along with any part identification associated with the vehicle. The restricted access switch 508 processes the request and the VIN. The restricted access switch 508 is then configured to send the request and the VIN to the taskbuilder 106 via a communication link 516.

The plant server 504 is configured to be upstream relative to the CPN 502 and downstream relative to the EDC 506. The plant server 504 is configured to facilitate operations associated with processes that occur during the assembly cycle of the vehicle. For example, the plant server 504 is configured to facilitate operations associated with at least the workstation 108 and/or the automatic station 507, the tracking controller 304, the quality database 110, the process editing tool 102, and the machine monitoring platform 404. The plant server 504 is generally comprised of the taskbuilder 106, a broadcast scheduling service 518, a build history service 520, a centralized database 522, and a process editor backend 524.

The taskbuilder 106 is configured to process the request and the VIN received by the workstation controller 510 and look upstream (e.g., access data upstream) at the centralized database 522 via a communication link 526 for build history and upstream prerequisite statuses associated with the assembly of the vehicle. The broadcast scheduling service 518 and the build history service 520 are configured to communicate data associated with the assembly of the vehicle to the centralized database 522 via communication links 528, 530. It is understood that both of the broadcast scheduling service 518 and the build history service 520 can communicate with the restricted access switch 508 directly to store information pertaining to the assembly of the vehicle so that future assemblies may be optimized. The taskbuilder 106 is further configured to determine a task list based on at least the build history and/or upstream prerequisite statuses stored in the centralized database 522. Additionally, the taskbuilder 106 is configured to send the task list downstream, back, to the restricted access switch 508 via a communication link 532. The restricted access switch 508 then distributes the task list to the workstation 108 and/or the automatic station 507 via a communication link 536 so that the workstation 108 and/or the automatic station 507 may apply the task list to the assembly of the vehicle.

A user 538 can navigate a process editing tool 540 to send a request to receive such updates regarding the manufacture of the one or more vehicles via a communication link 544*a*. It is understood that the EDC 506 may be a plant server. It is also understood that the EDC 506 may also be a company wide server, for example. The user 538 can also enter a particular configuration into the process editing tool 540 of a user device 542 via a communication link 544*b*. The user 538 can also save header information that may be used as an identifier of the vehicle. The user device 542 can send a confirmation, to the user 538, that the information sent by the user 538 has been saved via a communication link 546. The process editing tool 540 is configured to communicate with the process editor backend 524 so that up-to-date and accurate updates may be provided to the user 538. Additionally, the process editing tool 540 can send the saved header information to the process editor backend 524 via a communication link 548. The process editor backend 524 can then send the saved header information to the centralized database 522 via a communication link 550 to provide information that may aid in the formulation of the task list.

Figure 6:
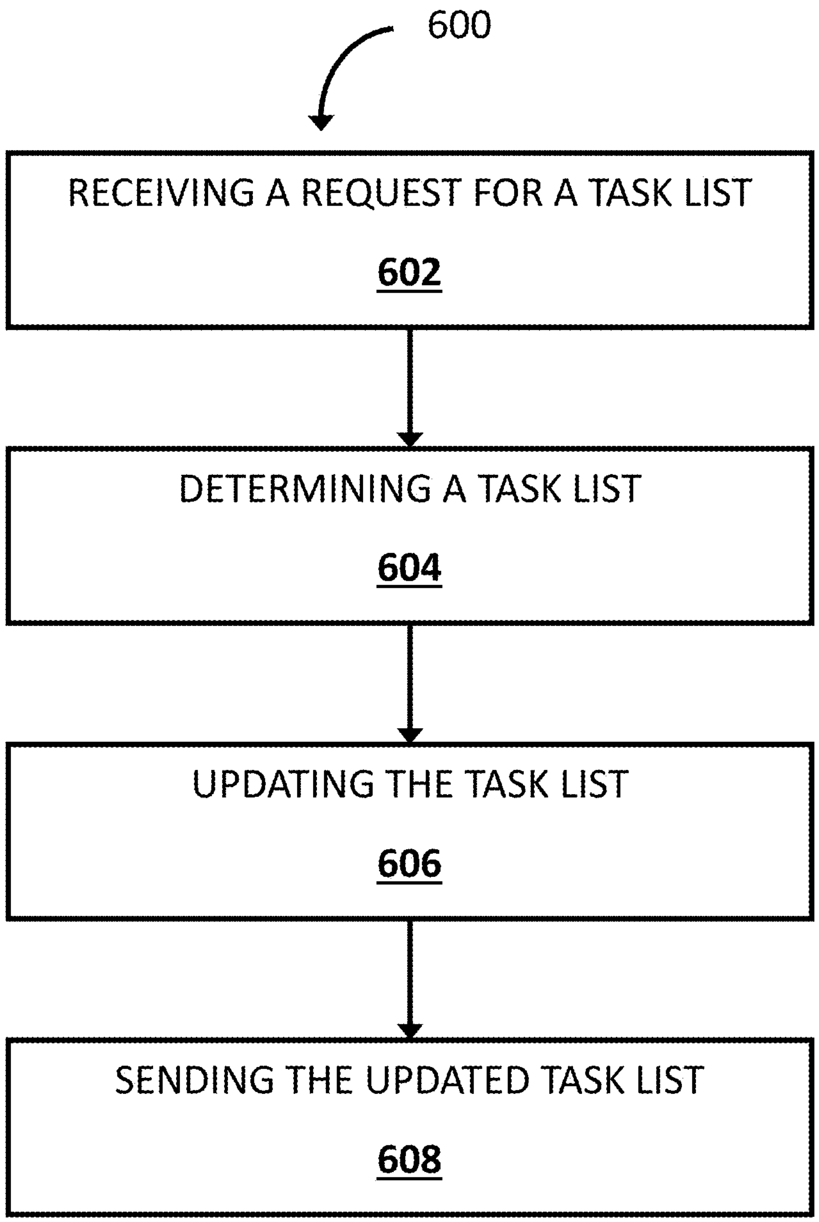
FIG. 6 is a flowchart illustrating an example method for scheduling and managing tasks in accordance with various implementations.

FIG. 6 is a flow chart illustrating an example method 600 associated with the scheduling and managing of tasks within a manufacturing setting. At operation 602, a request for a task list is received. For example, the request for the task list is received from one or more workstations (e.g., workstations 108). It is understood that the receipt of the task list may not only originate from the one or more workstations, but tasks from any automation processes that may track value-add and/or quality tasks. As another example, the request includes one or more identifiers. As a further example, the request for the task list is generated by a software controller of the one or more workstations. The task list may also be generated by a data translation service (e.g., the data translation service 121) associated with the software controller, for example. As another example, the software controller is configured to monitor a progression of an assembly through each of the one or more workstations. Additionally, as an example, one or more task results are sent, to the database, by the software controller. The one or more task results may also be sent by a data reporting service (e.g., the data reporting service 122) associated with the software controller, for example. As another example, the one or more identifiers include a vehicle identification number, a component identification, a unit identification, a part identification, a carrier identification, or a combination thereof. However, it is understood that the one or more identifiers may include any identifier related to the vehicle.

At operation 604, a task list is determined. For example, the task list is determined based on the one or more identifiers received from a scheduling system. As another example, the task list is based on product order specific information also received from the scheduling system. It is understood that the determination of the task list may be based on both the one or more identifiers and the product order specific information. However, it is also understood that the determination of the task list may also be based on either the one or more identifiers or the product order specific information.

At operation 606, the task list is updated. For example, updating the task list is based on a build history. As another example, updating the task list is based on one or more prerequisite statuses. It is understood that updating the task list may be based on both the build history and the one or more prerequisite statuses. However, it is also understood that updating the task list may be based on either the build history or the prerequisite statuses.

At operation 608, the updated task list is sent to the one or more workstations. In some examples, one or more configurations associated with the one or more workstations are stored. For example, the one or more configurations are received from a process editing tool. As another example, the one or more configurations include configuration hardware data, a list of component types, a list of tasks with configuration details associated with one or more workstations, or a combination thereof.

Figure 7:
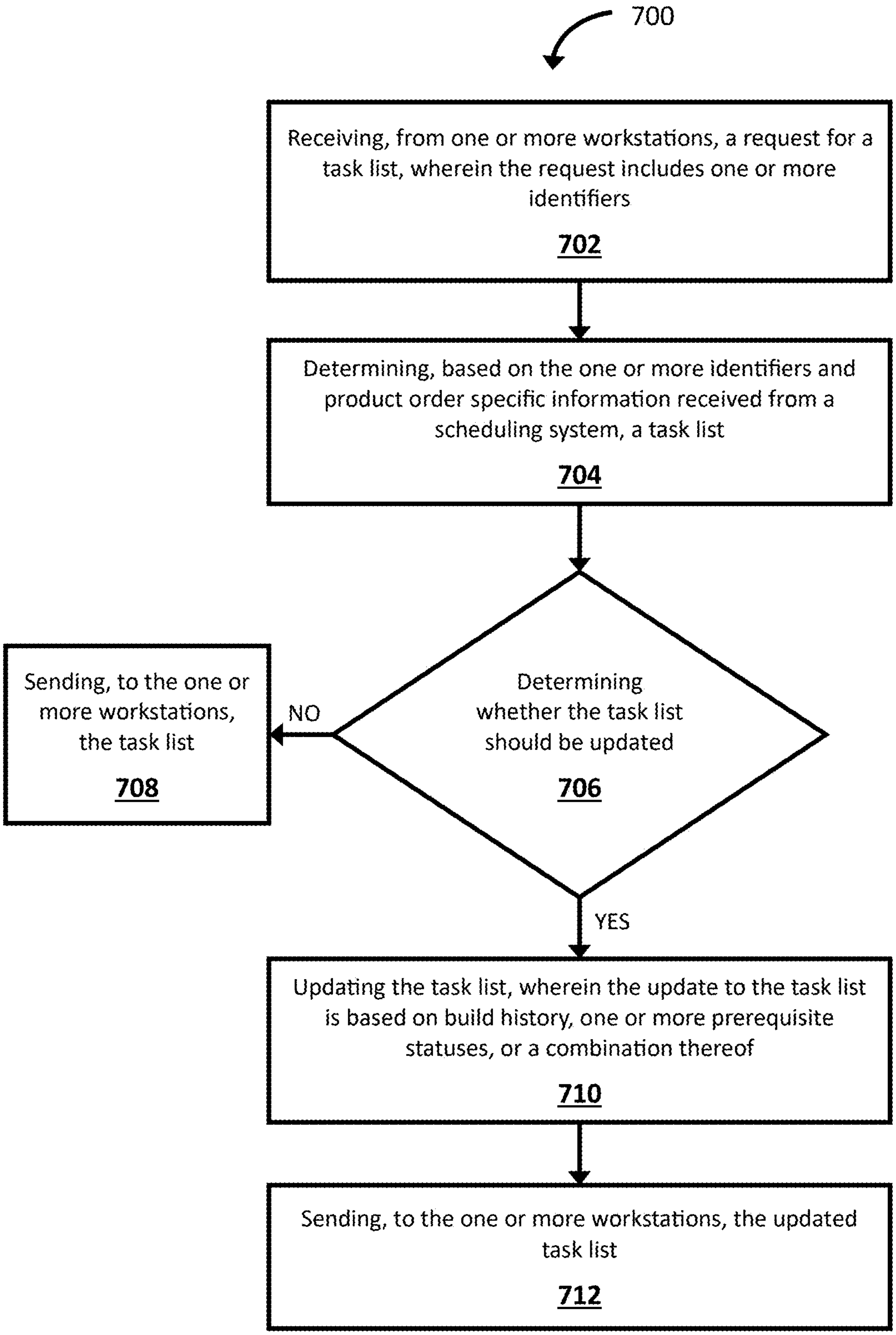
FIG. 7 is a flowchart illustrating another example method for scheduling and managing tasks in accordance with various implementations.

FIG. 7 is a flow chart illustrating an example method 700 for scheduling and managing of tasks within a manufacturing setting. At operation 702, a request for a task list is received from one or more workstations. For example, the request includes one or more identifiers. At operation 704, a task list is determined. For example, the task list is determined based on the one or more identifiers and/or product order specific information received from a scheduling system.

At operation 706, a determination is made regarding whether the task list should be updated. For example, a taskbuilder can look upstream to receive build history and/or prerequisite data from a database. For example, in the instance wherein neither the build history nor the prerequisite data indicate an optimization that renders an update to the task list advantageous to the manufacturing process, the taskbuilder can make the determination that the task list should not be updated. In the instance wherein an update to the task list is determined not to be advantageous to the manufacturing process, the task list is sent to the one or more workstations at operation 708.

However, in the instance wherein either of the build history and/or the prerequisite data indicate an optimization that renders an update to the task list advantageous to the manufacturing process, the taskbuilder makes the determination that the task list should be updated. In response, the task list is updated at operation 710. At operation 712, the updated task list is then sent to the one or more workstations. It should be noted that the methods 600, 700 can be performed using one or more systems, components, and/or processes described in more detail herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

receiving, from one or more workstations, a request for a task list, wherein the request includes one or more identifiers;

determining, based on the one or more identifiers and product order specific information received from a scheduling system, a task list;

updating the task list, wherein updating the task list is based on a build history, one or more prerequisite statuses, or a combination thereof, wherein updating the task list includes disabling tasks that would be undone to perform repairs to incomplete upstream tasks; and sending, to the one or more workstations, the updated task list.

2. The method of claim 1, further comprising:

storing, from a process editing tool, one or more configurations associated with the one or more workstations.

3. The method of claim 2, wherein one or more configurations include configuration hardware data, a list of component types, a list of tasks with configuration details associated with one or more workstations, or a combination thereof.

4. The method of claim 1, wherein the request for the task list is generated by:

a software controller of the one or more workstations; or a data translation service associated with the software controller.

5. The method of claim 4, wherein the software controller is configured to monitor a progression of an assembly through each of the one or more workstations.

6. The method of claim 4, wherein one or more task results are sent, to a database, by:

the software controller; or a data reporting service associated with the software controller.

7. The method of claim 1, wherein the one or more identifiers include a vehicle identification number, a component identification, a unit identification, a part identification, a carrier identification, or a combination thereof.

8. A system comprising:

a processor including a task builder configured to:

receive, from one or more workstations, a request for a task list, wherein the request includes one or more identifiers, determine, based on the one or more identifiers and product order specific information received from a scheduling system, a task list, update the task list, wherein the update to the task list is based on a build history, one or more upstream prerequisite statuses, or a combination thereof, wherein updating the task list includes disabling tasks that would be undone to perform repairs to incomplete upstream tasks, and send, to the one or more workstations, the updated task list;

the one or more workstations configured to:

send, to the task builder, the request for the task list, and send, to a database, one or more task results;

the scheduling system configured to:

receive, from the task builder, a request for the product order specific information, and send, to the task builder, the product order specific information; and the database configured to:

receive, from the one or more workstations, data associated with the build history and prerequisite statuses, receive, from the task builder, a request for the build history and the prerequisite statuses, and send, to the task builder, the build history and the prerequisite statuses.

9. The system of claim 8, wherein the system is further configured to:

store, from a process editing tool, one or more configurations associated with the one or more workstations.

10. The system of claim 9, wherein the one or more configurations include configuration hardware data, a list of component types, a list of tasks with configuration details associated with the one or more workstations, or a combination thereof.

11. The system of claim 8, wherein the request for the task list is generated by: a software controller of the one or more workstations; or a data translation service associated with a software controller of the one or more workstations.

12. The system of claim 11, wherein the software controller is configured to monitor a progression of an assembly through each of the one or more workstations.

13. The system of claim 8, wherein the one or more task results are sent by:

a software controller; or a data reporting service associated with the software controller.

14. The system of claim 8, wherein the one or more identifiers include a vehicle identification number, a component identification, a unit identification, a part identification, a carrier identification, or a combination thereof.

15. One or more non-transitory computer-readable media storing processor-executable instructions that, when executed by at least one processor, cause the at least one processor to:

receive, from one or more workstations, a request for a task list, wherein the request includes one or more identifiers;

determine, based on the one or more identifiers and product order specific information received from a scheduling system, a task list;

update the task list, wherein the update to the task list is based on a build history, one or more upstream prerequisite statuses, or a combination thereof, wherein updating the task list includes disabling tasks that would be undone to perform repairs to incomplete upstream tasks; and send, to the one or more workstations, the updated task list.

16. The one or more non-transitory computer-readable media of claim 15, wherein the at least one processor is further caused to:

store, from a process editing tool, one or more configurations associated with the one or more workstations.

17. The one or more non-transitory computer-readable media of claim 16, wherein the one or more configurations include configuration hardware data, a list of component types, a list of tasks with configuration details associated with the one or more workstations, or a combination thereof.

18. The one or more non-transitory computer-readable media of claim 15, wherein the request for the task list is generated by:

a software controller of the one or more workstations; or a data translation service associated with the software controller.

19. The one or more non-transitory computer-readable media of claim 18, wherein the software controller is configured to monitor a progression of an assembly through each of the one or more workstations.

20. The one or more non-transitory computer-readable media of claim 15, wherein the one or more identifiers include a vehicle identification number, a component identification, a unit identification, a part identification, a carrier identification, or a combination thereof.

* * * * *